US00RE44819E

(19) United States
(12) Reissued Patent
Braun et al.

(10) Patent Number: US RE44,819 E
(45) Date of Reissued Patent: Apr. 1, 2014

(54) TOOTHBRUSH

(75) Inventors: Phillip M. Braun, Exeter, RI (US); William A. Bredall, Pacifica, CA (US); Karen Claire-Zimmet, Waltham, MA (US); Thomas Craig Masterman, Brookline, MA (US); Mark Edward McConnell, Belmont, CA (US); Michael F. Roberts, Tucson, AZ (US); Thomas Overthun, San Francisco, CA (US)

(73) Assignee: Procter & Gamble Business Services Canada Company, Cincinnati, OH (US)

(21) Appl. No.: 10/820,562

(22) Filed: Apr. 8, 2004

Related U.S. Patent Documents

Reissue of:
(64) Patent No.: 6,553,604
Issued: Apr. 29, 2003
Appl. No.: 09/526,679
Filed: Mar. 16, 2000

(51) Int. Cl.
*A46B 9/04* (2006.01)
*A46B 7/06* (2006.01)

(52) U.S. Cl.
USPC ..... 15/167.1; 15/201

(58) Field of Classification Search
USPC ..... 15/167.1, 186, 201, 202
See application file for complete search history.

(56) References Cited

U.S. PATENT DOCUMENTS

| | | | |
|---|---|---|---|
| 301,644 | A | 7/1884 | Thompson |
| 429,839 | A | 6/1890 | Beissbarth |
| 601,405 | A | 3/1898 | Shepherd |
| 819,444 | A | 5/1906 | Monroe |
| 1,022,920 | A | 4/1912 | Anderson |
| 1,063,523 | A | 6/1913 | Farrar |
| 1,128,139 | A | 2/1915 | Hoffman |
| 1,142,698 | A | 6/1915 | Grove et al. |
| 1,172,109 | A | 2/1916 | Cammack |
| 1,191,556 | A | 7/1916 | Blake |
| 1,268,544 | A | 12/1916 | Cates |
| 1,251,250 | A | 12/1917 | Libby |
| 1,323,042 | A | 11/1919 | Gardner |
| 1,526,267 | A | 9/1924 | Dessau |
| 1,673,638 | A | 6/1928 | Peterson |
| 1,693,229 | A | 11/1928 | Felmar |
| 1,698,128 | A | 1/1929 | Funk |
| 1,704,564 | A | 3/1929 | Friedland |
| 1,753,290 | A | 4/1930 | Graves |

(Continued)

FOREIGN PATENT DOCUMENTS

| | | |
|---|---|---|
| AU | 44696/93 | 8/1993 |
| CA | 454913 | 3/1949 |

(Continued)

OTHER PUBLICATIONS

"Plastics—Determination of flexural properties", British Standard, BS EN ISO 178:2003, Apr. 9, 2003.

(Continued)

*Primary Examiner* — Randall Chin
(74) *Attorney, Agent, or Firm* — Fish & Richardson P.C.

(57) ABSTRACT

A toothbrush includes a handle, a head extending from the handle, and a plurality of tooth cleaning elements, such as tufts of bristles, extending from the head. Each tooth cleaning element is supported for rotation about primarily only one axis. Each tooth cleaning element is rotatable independent of the other tooth cleaning element(s).

41 Claims, 4 Drawing Sheets

(56) References Cited

U.S. PATENT DOCUMENTS 1,758,632 A 5/1930 Wagner
1,764,130 A 6/1930 Vardeman
1,796,893 A 3/1931 McVeigh
1,797,946 A 3/1931 Eichel
1,863,389 A 5/1931 Anderson
1,840,246 A 1/1932 Newman
1,908,510 A 5/1933 Dodson
1,924,152 A 8/1933 Coney et al.
1,963,389 A 6/1934 Vardeman
1,993,662 A 3/1935 Green
2,042,239 A 5/1936 Planding
2,088,839 A 8/1937 Coney et al.
2,117,174 A 5/1938 Jones
2,129,082 A 9/1938 Byrer
2,139,245 A 12/1938 Ogden
2,154,846 A 4/1939 Heymann et al.
2,155,473 A 4/1939 Coleman
2,164,219 A 6/1939 McGerry
2,172,624 A 9/1939 Robert
2,176,309 A 10/1939 Love et al.
2,189,175 A 2/1940 Jackson
2,206,726 A 7/1940 Lasater
2,219,753 A 10/1940 Seguin
2,225,331 A 12/1940 Campbell
2,238,603 A 4/1941 Runnels
2,244,699 A 6/1941 Hosey
2,246,867 A 6/1941 Thomas et al.
2,263,802 A 11/1941 Grusin
2,266,195 A 12/1941 Hallock
2,279,355 A 4/1942 Wilensky
2,312,828 A 3/1943 Adamsson
2,326,632 A 8/1943 Friedman
2,328,998 A 9/1943 Radford
2,364,205 A 12/1944 Fuller
2,486,203 A 10/1949 Pieper
2,486,847 A 11/1949 Hokett
2,556,691 A 6/1951 Harshbarger
2,604,649 A 7/1952 Stephenson et al.
2,637,870 A 5/1953 Cohen
2,702,914 A 3/1955 Kittle et al.
2,832,088 A 4/1958 Peilet et al.
2,882,544 A 4/1959 Hadidian
2,935,755 A 5/1960 Leira
3,007,441 A 11/1961 Eyer
3,016,554 A 1/1962 Peterson
3,050,072 A 8/1962 Diener
3,103,027 A 9/1963 Birch
3,110,918 A 11/1963 Tate
3,128,487 A 4/1964 Vallis
3,129,449 A 4/1964 Cyzer
3,159,859 A 12/1964 Rasmussen
3,177,509 A 4/1965 Cyzer
3,230,562 A 1/1966 Birch
3,258,805 A 7/1966 Rossnan
3,295,156 A 1/1967 Brant
3,302,230 A 2/1967 Poppelman
3,316,576 A 5/1967 Urbush
3,327,339 A 6/1967 Lemelson
3,359,588 A 12/1967 Kobler
3,398,421 A 8/1968 Rashbaum
3,403,070 A 9/1968 Lewis, Jr.
3,411,979 A 11/1968 Lewis
RE26,688 E 10/1969 Lemelson
3,553,759 A 1/1971 Kramer et al.
3,613,143 A 10/1971 Muhler et al.
4,033,008 A 7/1977 Warren et al.
4,081,877 A 4/1978 Vitale
4,114,222 A 9/1978 Serediuk
4,128,910 A 12/1978 Nakata et al.
4,156,620 A 5/1979 Clemens
4,202,361 A 5/1980 Bills
4,263,691 A 4/1981 Fakarnseree
4,277,862 A 7/1981 Weideman
4,288,883 A 9/1981 Dolinsky
4,356,585 A 11/1982 Protell et al.
4,373,541 A 2/1983 Nishioka
4,391,951 A 7/1983 Scheetz
4,403,623 A 9/1983 Mark
4,409,701 A 10/1983 Perches
4,429,434 A 2/1984 Sung-shan
4,472,853 A 9/1984 Rauch
4,476,280 A 10/1984 Poppe et al.
4,480,351 A 11/1984 Koffler
4,517,701 A 5/1985 Stanford, Jr.
4,525,531 A 6/1985 Zukosky et al.
4,534,081 A 8/1985 Spademan
4,545,087 A 10/1985 Nahum
4,585,416 A 4/1986 DeNiro et al.
4,603,166 A 7/1986 Poppe et al.
4,616,064 A 10/1986 Zukosky et al.
4,617,342 A 10/1986 Poppe et al.
4,617,694 A 10/1986 Bori
4,623,495 A 11/1986 Degoix et al.
4,633,542 A 1/1987 Taravel
4,654,922 A 4/1987 Chen
4,672,706 A 6/1987 Hill
4,691,405 A 9/1987 Reed
4,694,844 A 9/1987 Berl et al.
4,706,322 A 11/1987 Nicolas
4,751,761 A 6/1988 Breitschmid
4,776,054 A 10/1988 Rauch
4,783,874 A 11/1988 Perches et al.
4,802,255 A 2/1989 Breuer et al.
4,833,194 A 5/1989 Kuan et al.
4,845,795 A 7/1989 Crawford et al.
4,852,202 A 8/1989 Ledwitz
4,882,803 A 11/1989 Rogers et al.
4,892,698 A 1/1990 Weihrauch
4,894,880 A 1/1990 Aznavoorian
4,913,133 A 4/1990 Tichy
4,979,782 A 12/1990 Weihrauch
4,989,287 A 2/1991 Scherer
4,991,249 A 2/1991 Suroff
5,020,179 A 6/1991 Scherer
5,021,475 A 6/1991 Isayev
5,034,450 A 7/1991 Betz et al.
5,040,260 A 8/1991 Michaels
D325,821 S 5/1992 Schwartz
5,114,214 A 5/1992 Barman
5,120,225 A 6/1992 Amit
5,137,039 A 8/1992 Klinkhammer
5,142,724 A 9/1992 Park
5,150,495 A 9/1992 Discko et al.
5,165,131 A 11/1992 Staar
5,184,368 A 2/1993 Holland
5,186,627 A 2/1993 Amit et al.
5,228,166 A 7/1993 Gomez
5,269,038 A 12/1993 Bradley
D345,054 S 3/1994 Spence, Jr.
5,291,878 A 3/1994 Lombardo et al.
5,313,909 A 5/1994 Tseng et al.
5,318,352 A 6/1994 Holland
5,325,560 A 7/1994 Pavone et al.
5,334,646 A 8/1994 Chen
D350,851 S 9/1994 Spence, Jr.
5,350,248 A 9/1994 Chen
5,357,644 A 10/1994 Theriault
5,392,483 A 2/1995 Heinzelman et al.
5,398,366 A 3/1995 Bradley
5,407,254 A 4/1995 Hegemann
5,421,726 A 6/1995 Okada
5,435,032 A 7/1995 McDougall
5,458,400 A 10/1995 Meyer
5,476,384 A 12/1995 Giuliani et al.
5,524,319 A * 6/1996 Avidor ..... 15/167.1
5,528,786 A 6/1996 Porat et al.
5,535,474 A 7/1996 Salazar
5,546,626 A 8/1996 Chung
5,590,434 A 1/1997 Imai
5,593,213 A 1/1997 Meessmann
5,604,951 A 2/1997 Shipp
5,628,082 A 5/1997 Moskovich
5,651,157 A 7/1997 Hahn
5,678,275 A 10/1997 Defner

(56) References Cited

U.S. PATENT DOCUMENTS

| | | | |
|---|---|---|---|
| D386,617 | S | 11/1997 | Shyu |
| 5,706,542 | A | 1/1998 | Okada |
| 5,723,543 | A | 3/1998 | Modic |
| 5,735,011 | A | 4/1998 | Asher |
| 5,778,474 | A | 7/1998 | Shek |
| 5,791,007 | A | 8/1998 | Tsai |
| 5,799,354 | A | 9/1998 | Amir |
| 5,802,656 | A | 9/1998 | Dawson et al. |
| 5,813,079 | A | 9/1998 | Halm |
| 5,815,872 | A | 10/1998 | Meginniss, III et al. |
| 5,823,633 | A | 10/1998 | Weihrauch |
| D401,414 | S | 11/1998 | Vrignaud |
| 5,836,033 | A | 11/1998 | Berge |
| 5,839,148 | A | 11/1998 | Volpenhein |
| 5,842,249 | A | 12/1998 | Sato |
| 5,864,915 | A | 2/1999 | Ra |
| 5,896,614 | A | 4/1999 | Flewitt |
| 5,930,860 | A | 8/1999 | Shipp |
| 5,946,759 | A | 9/1999 | Cann |
| 5,970,564 | A | 10/1999 | Inns et al. |
| 5,974,619 | A | 11/1999 | Weihrauch |
| 5,987,681 | A | 11/1999 | Hahn et al. |
| 5,987,688 | A | 11/1999 | Roberts et al. |
| 5,991,959 | A | 11/1999 | Raven et al. |
| 6,006,395 | A | 12/1999 | Tiramani et al. |
| 6,018,840 | A | 2/2000 | Guay et al. |
| 6,035,476 | A | 3/2000 | Underwood et al. |
| 6,058,541 | A | 5/2000 | Masterman et al. |
| 6,067,684 | A | 5/2000 | Kweon |
| 6,088,870 | A | 7/2000 | Hohlbein |
| 6,112,361 | A | 9/2000 | Brice |
| 6,138,310 | A | 10/2000 | Porper et al. |
| 6,151,745 | A | 11/2000 | Roberts et al. |
| 6,161,245 | A | 12/2000 | Weihrauch |
| 6,178,582 | B1 | 1/2001 | Halm |
| 6,202,241 | B1 | 3/2001 | Hassell et al. |
| D440,048 | S | 4/2001 | Beals et al. |
| 6,209,164 | B1 | 4/2001 | Sato |
| D443,985 | S | 6/2001 | Beals et al. |
| 6,253,404 | B1 | 7/2001 | Boland et al. |
| 6,286,173 | B1 | 9/2001 | Briones |
| 6,298,516 | B1 | 10/2001 | Beals et al. |
| 6,308,367 | B1 | 10/2001 | Beals et al. |
| 6,363,565 | B1 | 4/2002 | Paffrath |
| 6,389,634 | B1 | 5/2002 | Devlin et al. |
| 6,391,445 | B1 | 5/2002 | Weihrauch |
| 6,405,401 | B1 | 6/2002 | Hellerud et al. |
| 6,421,865 | B1 | 7/2002 | McDougall |
| 6,421,867 | B1 | 7/2002 | Weihrauch |
| 6,453,497 | B1 | 9/2002 | Chiang et al. |
| 6,463,618 | B1 | 10/2002 | Zimmer |
| 6,477,729 | B1 | 11/2002 | Ben-Ari |
| 6,513,182 | B1 | 2/2003 | Calabrese et al. |
| 6,553,604 | B1 | 4/2003 | Braun et al. |
| 6,564,416 | B1 | 5/2003 | Claire et al. |
| 6,571,417 | B1 | 6/2003 | Gavney, Jr. et al. |
| 6,658,688 | B2 | 12/2003 | Gavney, Jr. |
| 6,701,565 | B2 | 3/2004 | Hafemann |
| 6,725,490 | B2 | 4/2004 | Blaustein et al. |
| 6,776,597 | B2 | 8/2004 | Bühler |
| 6,807,703 | B2 | 10/2004 | van Gelder et al. |
| 6,820,300 | B2 | 11/2004 | Gavney, Jr. |
| 6,826,797 | B1 | 12/2004 | Chenvainu et al. |
| 6,859,969 | B2 | 3/2005 | Gavney, Jr. et al. |
| 6,889,401 | B2 | 5/2005 | Fattori et al. |
| 6,892,412 | B2 | 5/2005 | Gatzemeyer et al. |
| 6,892,413 | B2 | 5/2005 | Blaustein et al. |
| 6,918,154 | B2 | 7/2005 | Ben-Ari |
| 6,931,688 | B2 | 8/2005 | Moskovich et al. |
| 6,938,294 | B2 | 9/2005 | Fattori et al. |
| 6,988,777 | B2 | 1/2006 | Pfenniger et al. |
| 6,993,804 | B1 | 2/2006 | Braun et al. |
| 7,008,225 | B2 | 3/2006 | Ito et al. |
| 7,160,508 | B2 | 1/2007 | Lee |
| 7,392,562 | B2 | 7/2008 | Boland et al. |
| 7,494,566 | B2 | 2/2009 | Carroll |
| 2001/0020314 | A1 | 9/2001 | Calabrese |
| 2002/0004964 | A1 | 1/2002 | Luchino et al. |
| 2002/0084550 | A1 | 7/2002 | Roberts et al. |
| 2002/0192621 | A1 | 12/2002 | Ben-Air |
| 2003/0033680 | A1 | 2/2003 | Davies et al. |
| 2003/0033682 | A1 | 2/2003 | Davies et al. |
| 2003/0041402 | A1 | 3/2003 | Stein et al. |
| 2003/0066147 | A1 | 4/2003 | Roh |
| 2003/0077107 | A1 | 4/2003 | Kuo |
| 2003/0079304 | A1 | 5/2003 | Dworzan |
| 2003/0084525 | A1 | 5/2003 | Blaustein |
| 2003/0084528 | A1 | 5/2003 | Chan |
| 2003/0140440 | A1 | 7/2003 | Gavney, Jr. |
| 2003/0159224 | A1 | 8/2003 | Fischer et al. |
| 2003/0196283 | A1 | 10/2003 | Eliav et al. |
| 2003/0229959 | A1 | 12/2003 | Gavney, Jr. et al. |
| 2004/0010869 | A1 | 1/2004 | Fattori et al. |
| 2004/0016067 | A1 | 1/2004 | Kraemer |
| 2004/0025275 | A1 | 2/2004 | Moskovich et al. |
| 2004/0060132 | A1 | 4/2004 | Gatzemeyer et al. |
| 2004/0060133 | A1 | 4/2004 | Eliav |
| 2004/0060137 | A1 | 4/2004 | Eliav |
| 2004/0068809 | A1 | 4/2004 | Weng |
| 2004/0083566 | A1 | 5/2004 | Blaustein et al. |
| 2004/0084063 | A1 | 5/2004 | Bago |
| 2004/0123409 | A1 | 7/2004 | Dickie |
| 2004/0128784 | A1 | 7/2004 | Ben-Ari |
| 2004/0168271 | A1 | 9/2004 | McDougall |
| 2004/0177458 | A1 | 9/2004 | Chan |
| 2004/0177462 | A1 | 9/2004 | Duff, Jr. et al. |
| 2004/0221409 | A1 | 11/2004 | Gavney, Jr. |
| 2004/0231076 | A1 | 11/2004 | Gavney, Jr. |
| 2004/0231082 | A1 | 11/2004 | Gavney, Jr. |
| 2004/0237236 | A1 | 12/2004 | Gavney, Jr. |
| 2004/0261203 | A1 | 12/2004 | Dworzan |
| 2005/0015901 | A1 | 1/2005 | Gavney, Jr. |
| 2005/0060822 | A1 | 3/2005 | Chenvainu et al. |
| 2005/0235439 | A1 | 10/2005 | Braun et al. |
| 2005/0273961 | A1 | 12/2005 | Moskovich et al. |
| 2006/0272112 | A9 | 12/2006 | Braun et al. |
| 2007/0251040 | A1 | 11/2007 | Braun et al. |
| 2008/0060155 | A1 | 3/2008 | Braun et al. |
| 2009/0172900 | A1 | 7/2009 | Brown, Jr. et al. |

FOREIGN PATENT DOCUMENTS

| | | | |
|---|---|---|---|
| CA | 2483825 | | 10/2004 |
| CH | 103 194 | | 1/1924 |
| CH | 169312 | | 5/1934 |
| CH | 609238 | | 2/1979 |
| DE | 558 852 | | 9/1932 |
| DE | 813 990 | | 7/1949 |
| DE | 1 883 020 | | 11/1963 |
| DE | 1 210 409 | | 2/1966 |
| DE | 73 43 826 | A | 11/1974 |
| DE | 2 402 785 | | 7/1975 |
| DE | 75 33 143 | U | 2/1976 |
| DE | 25 00 132 | | 7/1976 |
| DE | 25 46 712 | A | 4/1977 |
| DE | 27 15 414 | | 10/1978 |
| DE | 82 15 266.7 | U1 | 9/1982 |
| DE | 35 29 953 | | 3/1987 |
| DE | 37 44 630 | | 7/1989 |
| DE | 003928919 | A | 3/1991 |
| DE | 42 07 968 | | 9/1993 |
| DE | 94 000 231.2 | | 5/1994 |
| DE | 44 12 301 | | 10/1995 |
| DE | 19817704 | | 4/1998 |
| DE | 299 19 053 | | 1/2001 |
| DE | 100 28 530 | | 12/2001 |
| DK | 0076598 | | 11/1953 |
| EP | 0 189 816 | | 8/1986 |
| EP | 0 322 562 | | 7/1989 |
| EP | 0 360 766 | | 3/1990 |
| EP | 0 704 179 | | 4/1996 |
| EP | 0 857 026 | B1 | 1/2000 |
| EP | 0 972 464 | A1 | 1/2000 |
| EP | 0 783 850 | | 3/2001 |

(56) References Cited

FOREIGN PATENT DOCUMENTS

| | | | |
|---|---|---|---|
| EP | 1 080 664 | | 3/2001 |
| EP | 0 870 440 | | 12/2001 |
| FR | 459 442 | | 11/1913 |
| FR | 936529 | | 6/1948 |
| FR | 1075171 | | 10/1954 |
| FR | 2 541 100 | | 8/1984 |
| FR | 2 548 528 | | 1/1985 |
| FR | 2559361 | | 8/1985 |
| FR | 2 612 751 | | 9/1988 |
| FR | 2 616 306 | | 12/1988 |
| FR | 2 789 887 | | 8/2000 |
| FR | 2789887 | | 8/2000 |
| GB | 193 601 | A | 3/1923 |
| GB | 280 067 | A | 11/1927 |
| GB | 378 129 | A | 8/1932 |
| GB | 490 892 | A | 8/1938 |
| GB | 690 422 | A | 4/1953 |
| GB | 1 164 597 | A | 9/1969 |
| GB | 1 325 860 | A | 8/1973 |
| GB | 1 537 526 | | 12/1978 |
| GB | 2 137 080 | | 10/1984 |
| GB | 2 214 420 | | 9/1989 |
| GB | 2 247 297 | | 2/1992 |
| GB | 2 354 432 | | 3/2001 |
| GB | 2 371 217 | | 7/2002 |
| JP | 51-056165 | U | 5/1976 |
| JP | 52-125962 | U | 9/1977 |
| JP | 55-122633 | U | 9/1980 |
| JP | 58-091931 | U | 6/1983 |
| JP | 59-066433 | U | 5/1984 |
| JP | 61-090877 | | 5/1986 |
| JP | 61-187531 | U | 11/1986 |
| JP | 63-066928 | | 5/1988 |
| JP | 1-72128 | | 5/1989 |
| JP | 2-119031 | | 7/1990 |
| JP | 02-180203 | | 7/1990 |
| JP | 3-312978 | | 9/1991 |
| JP | 4-128627 | | 11/1992 |
| JP | 05-076416 | | 3/1993 |
| JP | 05069342 | | 3/1993 |
| JP | 405076416 | A | 3/1993 |
| JP | 05096597 | | 4/1993 |
| JP | 5-123222 | | 5/1993 |
| JP | 6-327517 | | 11/1994 |
| JP | 08-103326 | | 4/1996 |
| JP | 08-103332 | | 4/1996 |
| JP | 08-257043 | | 10/1996 |
| JP | 08-299372 | | 11/1996 |
| JP | 9-140456 | | 3/1997 |
| JP | 9-187319 | | 7/1997 |
| JP | 2000-157338 | | 6/2000 |
| JP | 2000-300345 | | 10/2000 |
| JP | 2000-300347 | | 10/2000 |
| JP | 2000-308524 | | 11/2000 |
| JP | 2001-190333 | | 7/2001 |
| JP | 2001-507360 | | 7/2001 |
| JP | 2002-010832 | | 1/2002 |
| JP | 2002-248118 | | 9/2002 |
| JP | 2003-61986 | | 3/2003 |
| JP | 2003-93415 | | 4/2003 |
| JP | 2003-164473 | | 6/2003 |
| RU | 1752336 | A1 | 5/1990 |
| RU | 2 045 216 | | 10/1995 |
| SU | 1752336 | | 8/1992 |
| WO | WO 91/05088 | | 4/1991 |
| WO | WO 92/04589 | | 3/1992 |
| WO | WO 93/24034 | | 12/1993 |
| WO | WO 95/01113 | | 1/1995 |
| WO | WO 96/15696 | | 5/1996 |
| WO | WO 96/23431 | | 8/1996 |
| WO | WO 96/28994 | | 9/1996 |
| WO | WO 97/14330 | | 4/1997 |
| WO | WO 98/01055 | | 1/1998 |
| WO | WO 98/18364 | | 5/1998 |
| WO | WO 99/37181 | | 7/1999 |
| WO | WO 00/21406 | | 4/2000 |
| WO | 00/34022 | | 6/2000 |
| WO | WO 00/30495 | | 6/2000 |
| WO | WO 00/47083 | | 8/2000 |
| WO | WO 00/64307 | | 11/2000 |
| WO | WO 00/76369 | | 12/2000 |
| WO | WO 01/06947 | | 1/2001 |
| WO | WO 01/06946 | | 2/2001 |
| WO | WO 01/21036 | | 3/2001 |
| WO | 01/89344 | | 11/2001 |
| WO | WO 01/87101 | | 11/2001 |
| WO | WO 02/05679 | | 1/2002 |
| WO | WO 02/11583 | | 2/2002 |
| WO | WO 02/19942 | | 3/2002 |
| WO | 02/38004 | | 5/2002 |
| WO | WO 02/45617 | | 6/2002 |
| WO | WO 03/015575 | | 2/2003 |
| WO | WO 03/086140 | | 10/2003 |
| WO | WO 2004/014181 | | 2/2004 |

OTHER PUBLICATIONS

Plastics Extrusion Technology Handbook, Chapter Seven, Coextrusion and Dual-Extrusion Technology, pp. 168-189.

Modem Plastics Encyclopedia, 67:168-175, 1990.

Pebax 3533 SA 00, "Base Polymer for Structural Hot Melt Adhesives".

Product Literature, Kraton Polymers, pp. 13-21.

"Standard Test Methods for Flexural Properties of Unreinforced and Reinforced Plastics and Electrical Insulating Materials [Metric][1]", *American Society for Testing Materials,* Designation: D 790M-93 Metric, pp. 1-9, Udated.

"Standard Terminology Relating to Plastics[1]", *American Society for Testing Materials,* Designation: D 883-00, pp. 1-15, Undated.

Hendricks et al., "Rubber-Related Polymers I. Thermoplastic Elastomers", *Rubber Technology,* pp. 515-533, Undated.

"Santroprene Rubber Physical Properties Guide, Tensile Properties, Dynamic Mechanical Properties, Tension and Compression Set, Fatigue Resistance", *Advanced Elastomer Systems,* pp. 2-19, Undated.

Board Opinion from the Chinese Patent Office with regard to Application No. 01806615.1 dated Jul. 17, 2007 with translation.

Distinctive Plastics, "Multi-Component Molding", http://www.distinctiveplastics.com/html/?id=2, 2006 (2 pages).

U.S. Appl. No. 10/389,448, filed Mar. 14, 2003 and Office Actions dated Jun. 2, 2006, Feb. 22, 2007, Oct. 26, 2007, Apr. 4, 2008, Jul. 2, 2008, and Feb. 25, 2009 (74 pages).

U.S. Appl. No. 11/825,387, Jul. 6, 2007 and Office Actions dated Dec. 6, 2007, Aug. 29, 2008, Feb. 11, 2009, Feb. 19, 2010, and Jun. 22, 2010 (58 pages).

U.S. Appl. No. 12/186,639, filed Aug. 6, 2008 and Office Actions dated Dec. 23, 2009 and Sep. 2, 2010 (27 pages.).

U.S. Appl. No. 10/830,693, filed Apr. 23, 2004 and Office Actions dated Aug. 17, 2006, May 15, 2007, Oct. 24, 2007, Mar. 3, 2008, Jul. 2, 2008, and Feb. 26, 2009 (63 pages).

U.S. Appl. No. 11/799,733, filed May 2, 2007 and Office Actions dated Apr. 25, 2008 and Jun. 19, 2009 (53 pages).

* cited by examiner

TOOTHBRUSH

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,553,604.*

*This application (U.S. application Ser. No. 10/820,562) is a reissue application based on U.S. application Ser. No. 09/526,679, filed Mar. 16, 2000, which previously issued as U.S. Pat. No. 6,553,604. U.S. application Ser. No. 12/828,653 and U.S. application Ser. No. 12/828,667 (now abandoned) were filed on Jul. 1, 2010 as divisional applications of and claim priority to U.S. application Ser. No. 10/820,562, filed on Apr. 8, 2004. Thus, U.S. application Ser. No. 10/820,562, U.S. application Ser. No. 12/828,653, and U.S. application Ser. No. 12/828,667 (now abandoned) are all reissue applications of U.S. Pat. No. 6,553,604.*

FIELD OF THE INVENTION

The invention relates generally to the field of oral care, and in particular to toothbrushes.

BACKGROUND OF THE INVENTION

A Japanese patent document having an application number of 3-312978 discloses a toothbrush having a multiplicity of tufts of nylon bristles. In a first embodiment shown in FIGS. 1, 2 and 3, a plurality of cylindrical recessed sections in the head are set orthogonally to the longitudinal axial direction of a shank and are formed at equal intervals. Column-shaped rotary bodies 5 are respectively contained in the recessed sections. On the peripheral surfaces of the rotary bodies 5, along the axial direction, projected strip sections 5a are formed, and they are set in a state that they are positioned at the opening sections of the recessed sections. At the opening sections of the recessed sections, contact surfaces to be positioned on both the sides are formed. At both the ends of the upper surfaces of the projected strip sections 5a, nylon bristles 6 are arranged to be vertically erected.

As shown in FIG. 3, the arrangement described above allows bristles 6 to rotate during use of the brush. A problem with this brush is that two tufts of bristles are secured to each strip section 5a and thus must rotate in unison. As a result, an individual tuft of bristles cannot rotate independently of its "partner" tuft. The individual tuft may thus be prevented from achieving optimal penetration between two teeth during brushing because the partner tuft might contact the teeth in a different manner and interfere with rotation of the individual tuft.

FIGS. 4, 5 and 6 disclose a second embodiment in which each tuft of bristles is secured to the head by a ball and socket type arrangement. While this embodiment allows each tuft of bristles to swivel independent of the other tufts, it does have disadvantages. If a tuft of bristles is tilted out towards the side of the head and that tuft is positioned near the interface between the side and top surfaces of the teeth, chances are increased that the bristle tips will not even be in contact with the teeth during brushing. Further, random orientation in which the tufts can end up after brushing detracts from the attractiveness of the brush.

SUMMARY OF THE INVENTION

The present invention is directed to overcoming one or more of the problems set forth above. Briefly summarized, according to one aspect of the present invention, a toothbrush includes a handle, a head extending from the handle, and a plurality of tooth cleaning elements, such as tufts of bristles, extending from the head. Each tooth cleaning element is supported for rotation about primarily only one axis. Each tooth cleaning element is rotatable independent of the other tooth cleaning element(s).

By having each tooth cleaning element supported for rotation about only one axis, the problems mentioned above for the ball and socket tuft support are avoided. That is, the chances are increased that the tooth cleaning element will remain in contact with teeth during brushing and the brush will be more attractive in appearance.

Further, as each tooth cleaning element is rotatable independent of the other tooth cleaning element(s), the problem discussed above with the first Japanese embodiment is avoided. Each tooth cleaning element can achieve optimal interdental penetration without interference from rotation by another tooth cleaning element.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
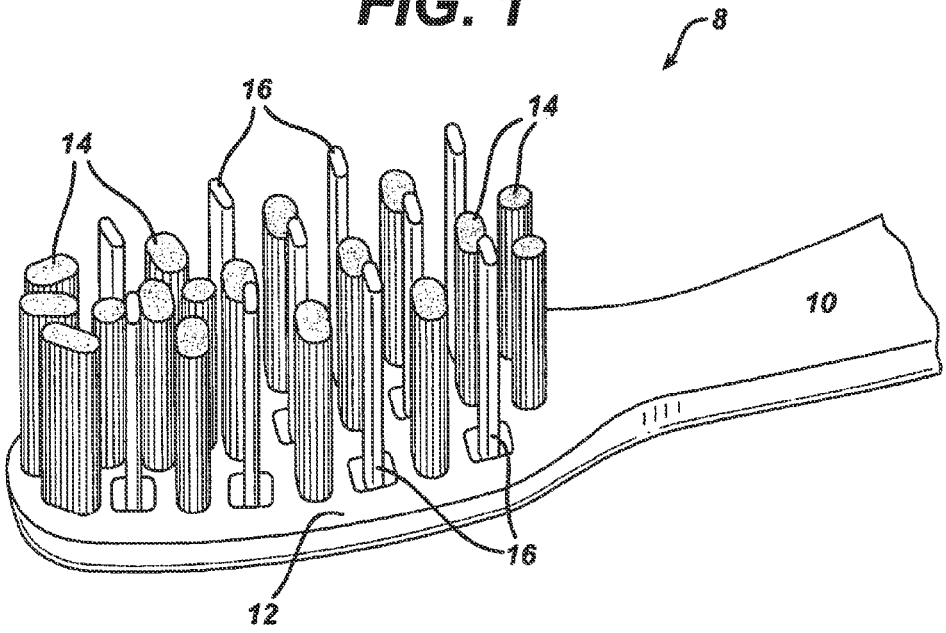
FIG. 1 is a perspective view of a toothbrush according to a first embodiment of the invention.

Beginning with FIG. 1, a toothbrush 8 includes a handle 10 from which extends a head 12. Head 12 includes a first group of tooth cleaning elements 14, such as tufts of bristles, which are secured to the head in a conventional manner (e.g. by stapling or hot-tufting). Elements 14 are designed to clean the exposed surfaces of teeth.

A second group of tooth cleaning elements 16 are secured to head 12 such that each element can independently rotate about a single axis during use of the brush. Each elements 16 can be a tuft of bristles or, alternatively, a single unitary fin made of plastic or rubber. Elements 16 are designed to penetrate in between teeth to clean the interdental spaces.

The interproximal residence time of elements 16 is significantly increased as compared to elements 14 which are rigidly fixed to head 12. An experiment was conducted in which the interproximal residence time was determined for fixed tufts at both a 0 degree (like element 14) and 16 degree forward angle, and for rotating tufts such as element 16. The tufts had an average of 40 bristles each with each bristle having a 7-mil diameter. Residence times were measured on a Single Filament Tester (SFT) with a load of 4 g/tuft at velocities between 0.5 and 10 in/s.

Figure 6:
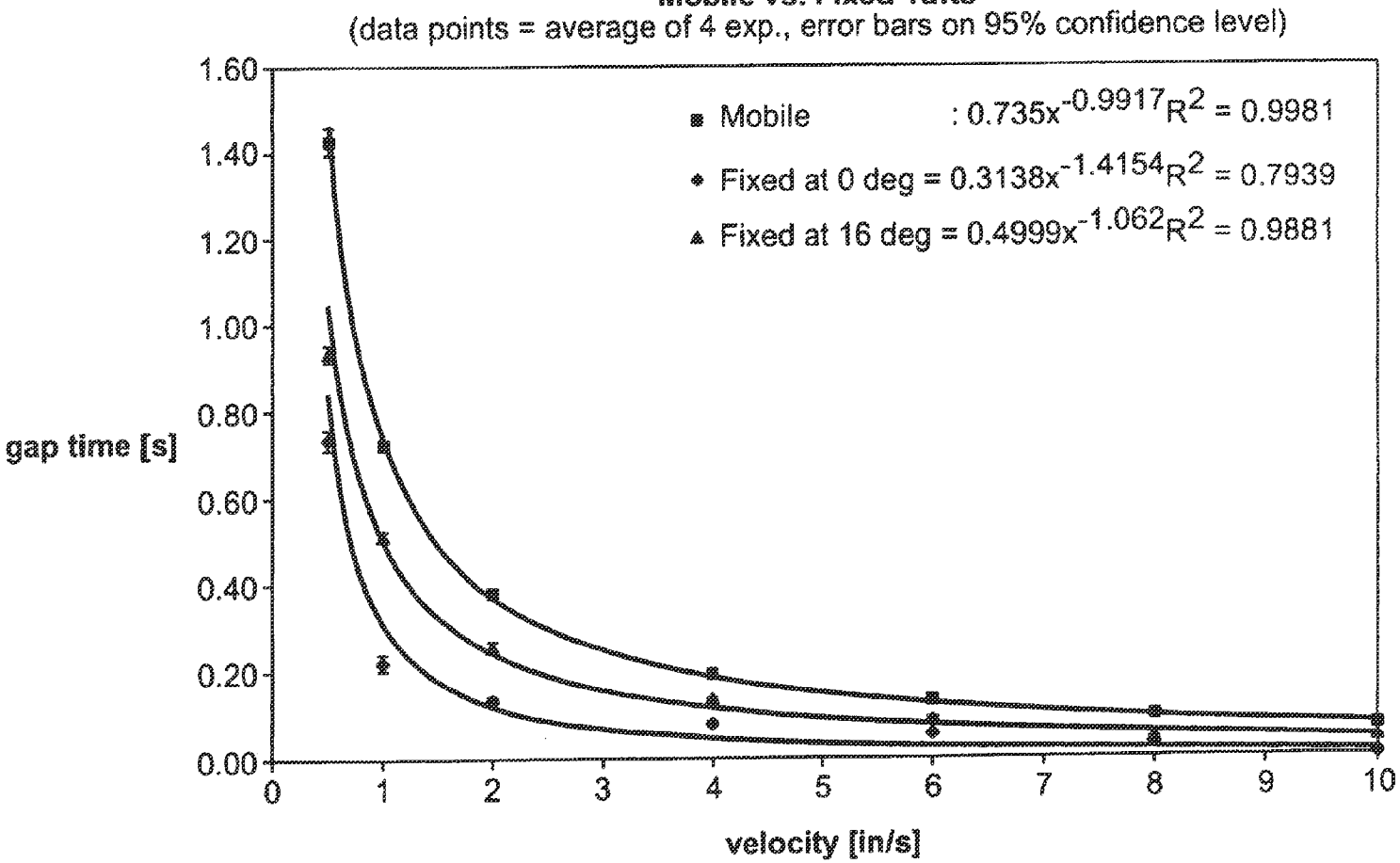
FIG. 6 is a graph showing interproximal residence time of mobile tufts and fixed tufts in the interdental gap(s).

The graph of FIG. 6 shows interproximal residence time of mobile tufts and fixed tufts in the interdental gap(s). The data are averages over 4 experiments. The error bars represent the error of the mean at the 95% confidence level. This experimental data shows that rotating tufts experience 1.6 times more interproximal residence time compared to angled fixed bristle tufts, and 2.7 times more interproximal residence time compared to vertical fixed bristle tufts. More interproximal residence time translates into better cleaning between teeth .

Figure 3:
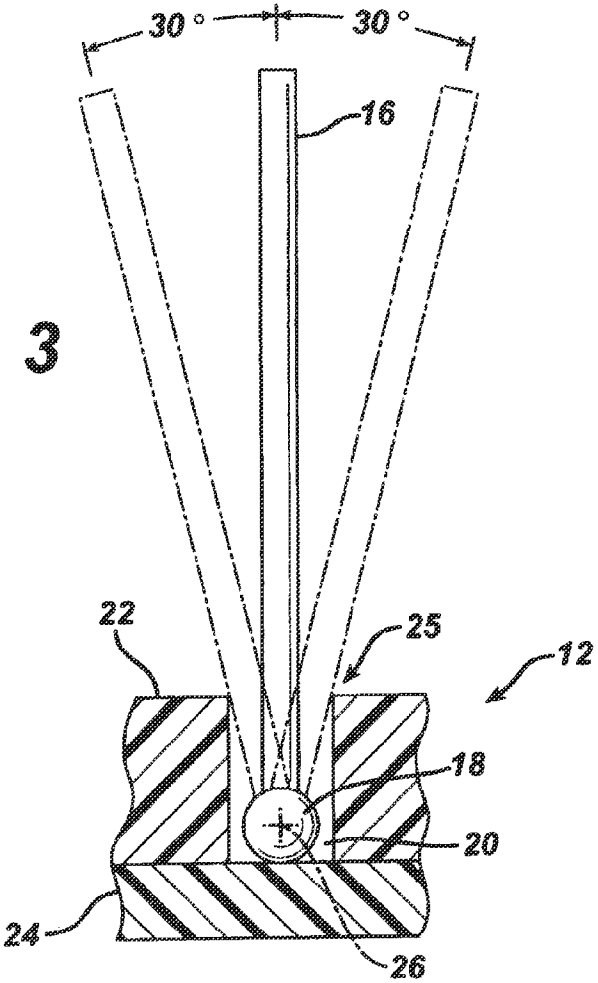
FIG. 3 is a sectional view taken along the lines 3-3 of FIG. 2.
Figure 2:
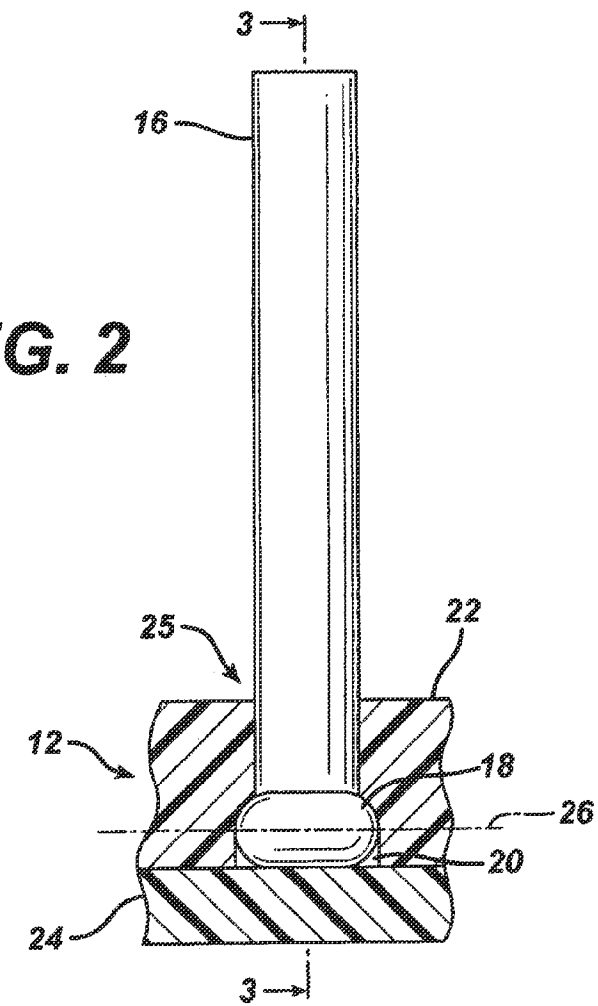
FIG. 2 is a partial sectional view of the head of the toothbrush of FIG. 1 and one of the tooth cleaning elements.

With reference to FIGS. 2 and 3, the structure for enabling element 16 to rotate and its methods of manufacture will be described. Element 16 includes at its lower end a unitary bearing 18 which is cylindrical in shape and rounded at its ends. Bearing 18 can be formed by either melting some of the material from which element 16 is made, or by molding the bearing in a separate molding operation.

Such a molding operation would use a high flow material such as Exxon Escorene Polypropylene PP-1105, or FINA Polypropylene 3824. It is important to gate from both sides and to have very low pack pressure during the molding operation. An undercut on element 16 is preferable in order to secure bearing 18 to element 16. If bearing 18 is molded separately and then secured to element 16, an adhesive can be used in place of the undercut to secure element 16 and bearing 18 together.

An example of a specific molding operation would be to use a 90 Ton Toshiba Injection Molding Machine to mold Exxon Escorene Polypropylene PP-1105. The temperature profile is a 350 F. barrel temperature, a 350 F. rear temperature, a 405 F. front temperature and a 390 F. nozzle temperature. The mold temperature is preferably about 90 F., and a 1/16 inch nozzle should be used. Fill time is 0.25 seconds, screw forward time is 3.75 seconds, injection time is 4.00 seconds and cool time is 15 seconds. Peak hydraulic pressure is 250 psi.

Head 12 is actually made up of a top piece 22 and a bottom piece 24. Both of these pieces are created in separate molding steps with piece 22 being integrally molded with the brush handle. Element 16 is inserted through an aperture 25 in top piece 22 bearing end last to the position shown in the figures. Aperture 25 includes a bearing socket 20 which captures bearing 18. It is preferable to insert a viscous substance, such as some food-grade grease, into socket 20 to provide some resistance to rotation of element 16 to prevent the element from loosely flopping back and forth. Finally, piece 24 is fixed to piece 22 to secure bearing 18 in socket 20. Piece 24 can be secured to piece 22 by, for example, snap features (not shown) or heat welding. Alternatively, piece 24 can be injection molded into place.

An alternative manufacturing method to using two pieces 22, 24 for the head is to injection mold the entire head (and handle) about bearing 18. A higher melting temperature material would need to be used for element 16 and bearing 18 so that they are not softened/melted during injection molding of the head/handle. Element 16 can be exercised after completion of the brush by rotating the element back and forth to free it in the event some plastic from the head is interfering with rotation.

The arrangement described above allows element 16 to rotate back and forth about only one axis 26 which is preferably substantially perpendicular to a long axis of element i6. Preferably, element 16 can rotate about 30 degrees either side of vertical. The top of aperture 25 limits the amount of rotation that can be experienced by element 16. It should be noted that there is no spring force or other force which returns element 16 to a home position, so the element can end up at any one of an infinite number of positions along its 60 degree freedom of movement at the end of the brushing process.

Alternatively, bearing 18 could be made in a spherical shape. Use of such a spherical bearing would still only allow element 16 to rotate about only one axis because, as shown in FIG. 2, head 12 fits up against opposite sides of element 16, thereby restricting rotation to occurring about one axis only.

Figure 4:
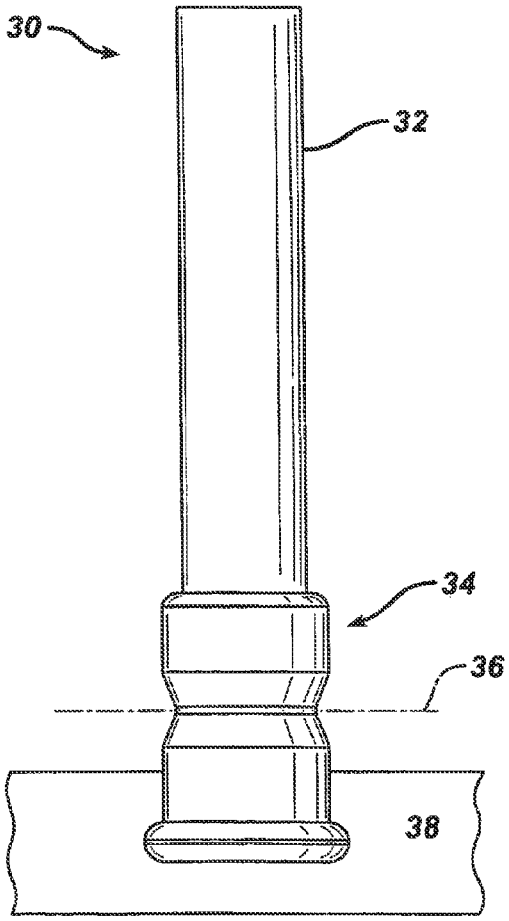
FIG. 4 is a front view of an alternative tooth cleaning element.
Figure 5:
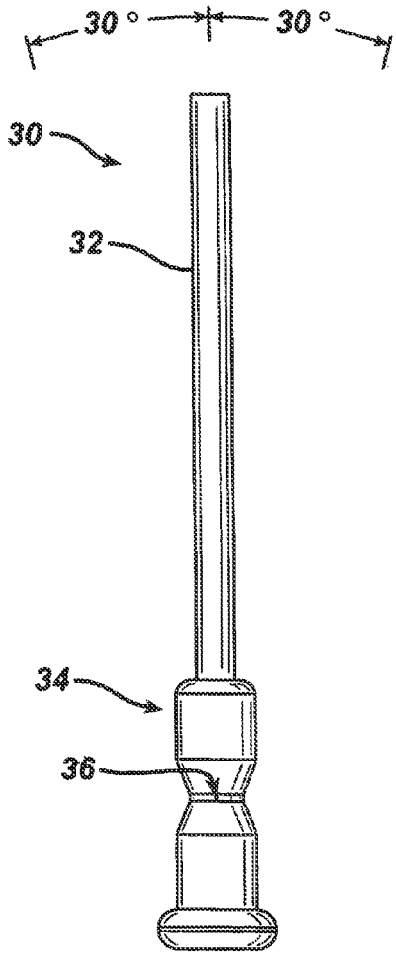
FIG. 5 is a side view of the tooth cleaning element of FIG. 4.

Turning to FIGS. 4 and 5, an alternative tooth cleaning element will be described. Element 30 includes a tooth cleaning portion 32 which can be a tuft of bristles or a unitary plastic or rubber fin. A hinge 34 (e.g. a living hinge) made of a soft plastic or elastomer is injection molded onto cleaning portion 32. The material from which hinge 34 is made must be carefully selected, because if it is too soft, retention of element 16 will be poor, and if the material is too hard, the hinge will not be flexible enough. The hinge is preferably made of GLS Corp.'s DYNAFLEX thermoplastic rubber compound G2780 or G2711 and can be injection molded under the conditions outlined above. The living hinge allows cleaning portion 32 to rotate primarily only about an axis 36 which, as described above, is preferably substantially perpendicular to a long axis of portion 32. Resistance to rotation increases as portion 32 is moved away from a position vertical to the top surface of the brush head. A toothbrush head 38 with integral handle (not shown) is injection molded about a base portion of living hinge 34 to capture the living hinge in the head (see FIG. 4).

The invention has been described with reference to a preferred embodiment. However, it will be appreciated that variations and modifications can be effected by a person of ordinary skill in the art without departing from the scope of the invention.

What is claimed is:

1. [A toothbrush] *An apparatus*, comprising[;]:

a *toothbrush* handle;

a *toothbrush* head extending from the *toothbrush* handle; and a plurality of tufts of bristles extending from the head, *the tufts of bristles sized such that multiple tufts of bristles are placed beside each other in a direction generally orthogonal to the handle,* each tuft of bristles being supported for rotation about only one axis, each tuft of bristles being rotatable independent of [the other tuft(s) of bristles] *one another*.

2. The [toothbrush] *apparatus* of claim 1, wherein each tuft has a range of rotation of about 60 degrees.

3. The [toothbrush] *apparatus* of claim 1, wherein each tuft can rotate about 30 degrees to either side of a vertical position in which the tuft is perpendicular to a top surface of the head.

4. The [toothbrush] *apparatus* of claim 1, further including at least one tooth cleaning element which cannot be rotated.

5. The [toothbrush] *apparatus* of claim 1, wherein each tuft includes at its non-brushing end a bearing which is substantially cylindrical in shape in its major portion, each bearing being secured in its own hollow space within the head, each bearing allowing rotation of its respective tuft.

6. The [toothbrush] *apparatus* of claim 5, wherein the head is made of at least two pieces which are joined together to secure the bearing within the head.

7. The [toothbrush] *apparatus* of claim 5, wherein a viscous substance is provided in each hollow space in the head to provide some resistance to rotation of the tufts.

8. The [toothbrush] *apparatus* of claim 1, wherein a portion of the head limits rotation of each tuft.

9. The [toothbrush] *apparatus* of claim 1, wherein the tufts are rotated by contact with a portion of an oral cavity.

10. The [toothbrush] *apparatus* of claim 1, wherein each tuft includes at its non-brushing end a living hinge, each living hinge being secured partially within the head, each living hinge allowing rotation of its respective tuft.

11. The [toothbrush] *apparatus* of claim 1, wherein the axis about which each tuft is rotatable is substantially perpendicular to a long axis of the [element] *tuft*.

*12. The apparatus of claim 1, wherein two or more of the tufts of bristles are disposed in a row extending generally laterally across a long axis of the toothbrush handle.*

*13. An apparatus comprising:*

*a toothbrush head having a longitudinal axis; and*

*a first group of tooth cleaning elements extending from the head and a second group of a plurality of tooth cleaning elements extending from the head,*

*the elements within each of the groups being of a common type and the type of elements in the first group being different from the type of elements in the second group, and*

*wherein each of the elements of the first group is nonrotatable, and*

*wherein each of the elements in the second group is supported for rotation about only one axis and independently rotatable with respect to any other rotatable tooth cleaning element on the toothbrush head, the elements of the second group sized such that multiple elements of the second group are placed beside each other in a direction generally orthogonal to the longitudinal axis of the toothbrush head*

*wherein the axis about which each element in the second group is rotatable is substantially perpendicular to the longitudinal axis of the toothbrush head.*

*14. The apparatus of claim 13 wherein all of the tooth cleaning elements of the toothbrush are in the first and second group.*

*15. The apparatus of claim 13 wherein the first group includes a plurality of tooth cleaning elements.*

*16. The apparatus of claim 13 wherein each of the elements in the second group is adjacent to at least one of the elements in the first group.*

*17. The apparatus of claim 13 wherein the interproximal residence time of elements in the second group is about 1.6 times or greater than the interproximal residence time of the elements in the first group.*

*18. The apparatus of claim 13 wherein the elements in the second group are longer than the elements in the first group.*

*19. The apparatus of claim 13 wherein the elements in the second group are made of polymer.*

*20. The apparatus of claim 13 wherein each of the elements in the second group is a fin or tuft of bristles.*

*21. The apparatus of claim 13 wherein each of the elements in the second group is a fin.*

*22. The apparatus of claim 21 wherein each of the elements in the first group is a tuft of bristles.*

*23. The apparatus of claim 13, further comprising a handle, and wherein the head extends from the handle.*

*24. The apparatus of claim 13 wherein the elements in the first group are free of spring bias tending to rotate the elements after deflection.*

*25. The apparatus of claim 13, wherein the type of elements in the first group is structurally different from the type of elements in the second group.*

*26. The apparatus of claim 13, wherein the type of elements in the first group is compositionally different from the type of elements in the second group.*

*27. The apparatus of claim 13, wherein the type of elements in the first group is structurally and compositionally different from the type of elements in the second group.*

*28. The apparatus of claim 13, wherein the elements in the first group are rigidly secured to the toothbrush head.*

*29. The apparatus of claim 13, wherein two or more of elements of the second group are disposed in a row extending generally laterally across a long axis of the toothbrush head.*

*30. An apparatus comprising:*

*a toothbrush head having a longitudinal axis; and*

*a plurality of tufts of bristles extending from the head, each tuft of bristles being supported for rotation about only one axis, each tuft of bristles being rotatable independent of all other rotatable tuft(s) of bristles on the toothbrush head, the tufts of bristles sized such that multiple tufts of bristles are placed beside each other in a direction generally orthogonal to the longitudinal axis of the toothbrush head,*

*further including at least one tooth cleaning element which cannot be rotated.*

*31. The apparatus of claim 30, wherein each tuft has a range of rotation of about 60 degrees.*

*32. The apparatus of claim 30, wherein each tuft can rotate about 30 degrees to either side of a vertical position in which the tuft is perpendicular to a top surface of the head.*

*33. The apparatus of claim 30, wherein each tuft includes at its non-brushing end a bearing which is substantially cylindrical in shape in its major portion, each bearing being secured in its own hollow space within the head, each bearing allowing rotation of its respective tuft.*

*34. The apparatus of claim 33, wherein the head is made of at least two pieces which are joined together to secure the bearing within the head.*

*35. The apparatus of claim 33, wherein a viscous substance is provided in each hollow space in the head to provide some resistance to rotation of the tufts.*

*36. The apparatus of claim 30, wherein a portion of the head limits rotation of each tuft.*

*37. The apparatus of claim 30, wherein the tufts are rotated by contact with a portion of an oral cavity.*

*38. The apparatus of claim 30, wherein each tuft includes at its non-brushing end a living hinge, each living hinge being secured partially within the head, each living hinge allowing rotation of its respective tuft.*

*39. The apparatus of claim 30, wherein the axis about which each tuft is rotatable is substantially perpendicular to a long axis of the element.*

*40. The apparatus of claim 30, further comprising a handle.*

*41. The apparatus of claim 30, wherein two or more of the tufts of bristles are disposed in a row extending generally laterally across a long axis of the toothbrush head.*

* * * * *